US012770060B2

(12) United States Patent
Sakuragi et al.

(10) Patent No.: US 12,770,060 B2
(45) Date of Patent: Oct. 20, 2026

(54) ADDITIONAL TRAINING APPARATUS, ADDITIONAL TRAINING METHOD, AND STORAGE MEDIUM

(71) Applicant: KABUSHIKI KAISHA TOSHIBA, Tokyo (JP)

(72) Inventors: Rei Sakuragi, Kawasaki (JP); Akira Sugimoto, Kawasaki (JP); Takahiro Takimoto, Yokohama (JP); Tsukasa Ike, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 919 days.

(21) Appl. No.: 18/169,830

(22) Filed: Feb. 15, 2023

(65) Prior Publication Data

US 2024/0037448 A1 Feb. 1, 2024

(30) Foreign Application Priority Data

Jul. 26, 2022 (JP) ................................ 2022-118861

(51) Int. Cl.
*G06N 20/00* (2019.01)

(52) U.S. Cl.
CPC .................................. *G06N 20/00* (2019.01)

(58) Field of Classification Search
CPC ..................................................... G06N 20/00
See application file for complete search history.

(56) References Cited

U.S. PATENT DOCUMENTS 11,514,321 B1 * 11/2022 Chen ........................ G06N 3/08
2019/0251471 A1 8/2019 Morita et al.
2021/0224683 A1 7/2021 Price et al.
2021/0287135 A1 * 9/2021 Shiono .................. G07C 5/008
2021/0312235 A1 * 10/2021 Tsuchiya ............. G06F 18/2148
2021/0365813 A1 * 11/2021 Nakano ................. G06N 20/00
(Continued)

FOREIGN PATENT DOCUMENTS

JP 2017224184 A 12/2017
JP 2020107102 A 7/2020
JP 2021139769 A 9/2021

OTHER PUBLICATIONS

Chawla, "Data Mining for Imbalanced Datasets: An Overview", Data Mining and Knowledge Discovery Handbook, Second Edition, pp. 875-886, 2010.
(Continued)

*Primary Examiner* — Dave Misir
(74) *Attorney, Agent, or Firm* — Holtz, Holtz & Volek PC

(57) ABSTRACT

According to one embodiment, an additional training apparatus includes processing circuitry. The processing circuitry stores, in a memory, a plurality of pieces of existing training data in which existing data is input data and a classification of defects according to the existing data is output data, and cluster data representing clusters to which the respective pieces of existing training data belong. The processing circuitry extracts a plurality of pieces of first existing training data from the pieces of existing training data in accordance with a size of each of the clusters. The processing circuitry acquires a plurality of pieces of new training data in which new data is input data and a classification of defects according to the new data is output data.

11 Claims, 10 Drawing Sheets

(56) References Cited

U.S. PATENT DOCUMENTS

2022/0237407 A1* 7/2022 Umeda ............... G06F 18/2431
2022/0405605 A1* 12/2022 Yokoyama ................ G06T 7/00

OTHER PUBLICATIONS

Japanese Office Action (and an English language translation thereof) dated Oct. 28, 2025, issued in corresponding Japanese Application No. 2022-118861.

Imoto, et al., "Automated Defect Classification System for Semiconductor Manufacturing Processes Using Deep Learning", Toshiba Review, vol. 74 No. 5 (Sep. 2019), Japan, Toshiba, Sep. 24, 2019, p. 13-16 06 09.

Tagawa, Seiji, "Proposal of a Two-Stage Random Sampling Method for large-scale Imbalanced Data", Information Processing Society of Japan Research Report Mathematical Modeling and Problem Solving, vol. 2021—MPS—133 No. 13, Japan, Information Processing Society of Japan, Sep. 21, 2021, p. 1-6.

* cited by examiner

ADDITIONAL TRAINING APPARATUS, ADDITIONAL TRAINING METHOD, AND STORAGE MEDIUM

CROSS-REFERENCE TO RELATED APPLICATION

This application is based upon and claims the benefit of priority from prior Japanese Patent Application No. 2022-118861, filed Jul. 26, 2022, the entire contents of which are incorporated herein by reference.

FIELD

Embodiments described herein relate generally to an additional training apparatus, an additional training method, and a storage medium.

BACKGROUND

In manufacturing industries, there is a case where a trained model is practically used which is trained to automatically classify defects of products, based on training data including existing data acquired in a manufacturing process of the products, and a classification of defects according to the existing data. In this case, if new data with a distribution that does not exist in the training data occurs with the passing of time, such a situation occurs that the classification accuracy of defects is low in the trained mode that is being practically used. In this situation, it is necessary to update the trained model such that defects can accurately be classified also in regard to the new data of the products.

In connection with this, there is known a method of updating a trained model by applying additional training (fine tuning) to the trained model by using additional training data in which new data is added to existing data.

According to the study by the present inventor, in this additional training method, in a case where the existing data is randomly down-sampled at a time of preparing the additional training data, the tendency and features that the existing data has are lost due to the random sampling. Consequently, there may be a case where the classification accuracy of the trained model in regard to the existing data deteriorates.

Accordingly, as the method of additional training, it is desirable to improve the classification accuracy of the new data while maintaining the classification accuracy of the existing data.

DETAILED DESCRIPTION

In general, according to one embodiment, an additional training apparatus includes processing circuitry. The processing circuitry is configured to store, in a memory, a plurality of pieces of existing training data in which existing data is input data and a classification of defects according to the existing data is output data, and cluster data representing clusters to which the respective pieces of existing training data belong. The processing circuitry is configured to extract, based on the cluster data, a plurality of pieces of first existing training data from the pieces of existing training data in accordance with a size of each of the clusters. The processing circuitry is configured to acquire a plurality of pieces of new training data in which new data is input data and a classification of defects according to the new data is output data. The processing circuitry is configured to store in the memory a plurality of pieces of additional training data that are based on the pieces of first existing training data and the pieces of new training data.

Hereinafter, embodiments are described with reference to the accompanying drawings. In the description below, similar structures are indicated by identical reference signs, and an overlapping description is omitted.

First Embodiment

Figure 1:
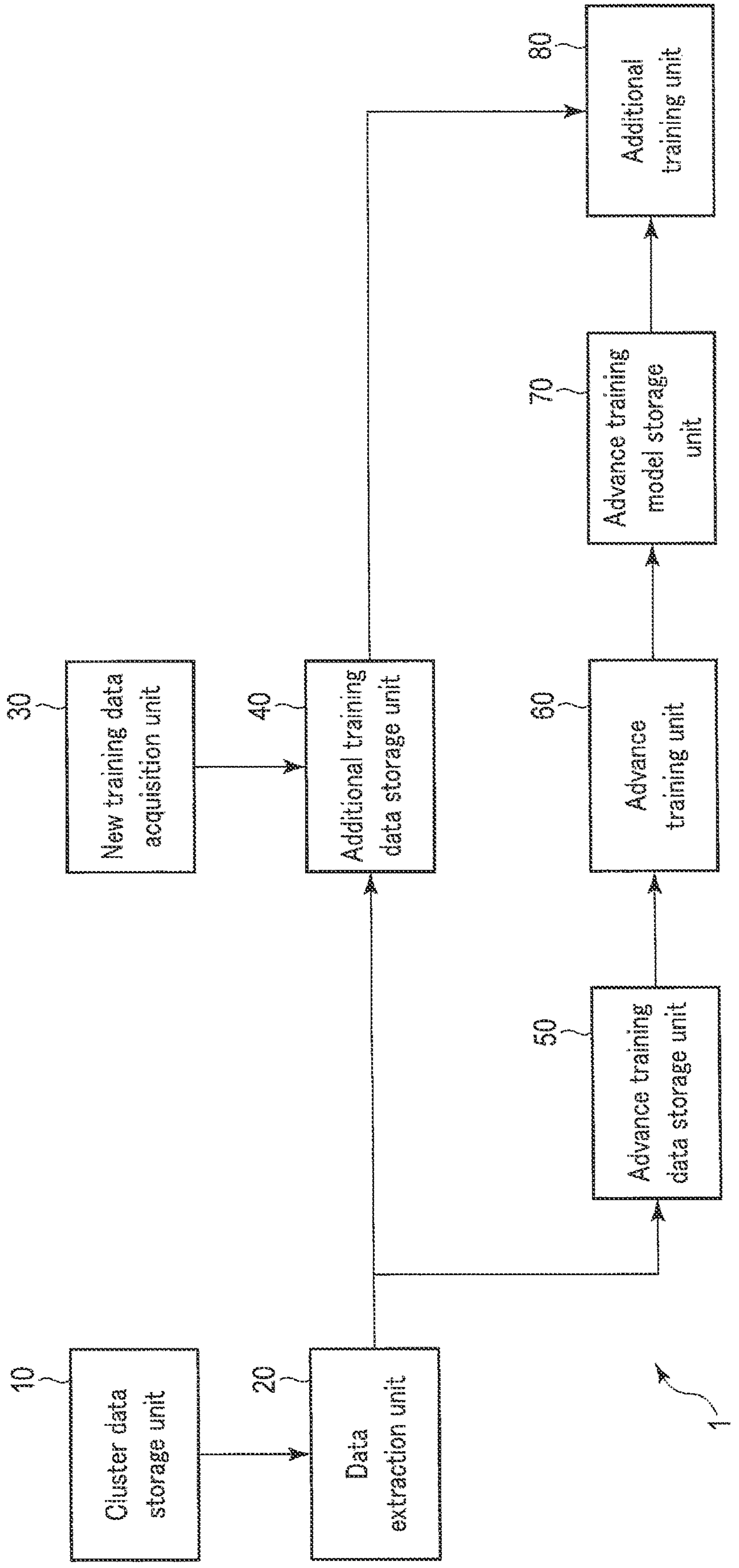
FIG. 1 is a block diagram illustrating an example of an additional training apparatus according to a first embodiment.

FIG. 1 is a block diagram illustrating an example of an additional training apparatus according to a first embodiment. An additional training apparatus 1 includes a cluster data storage unit 10, a data extraction unit 20, a new training data acquisition unit 30, an additional training data storage unit 40, an advance training data storage unit 50, an advance training unit 60, an advance training model storage unit 70, and an additional training unit 80.

Here, the cluster data storage unit 10 stores a plurality of pieces of existing training data in which existing data is input data and a classification of defects according to the existing data is output data, and cluster data representing clusters to which the respective pieces of existing training data belong. As the output data, for example, use may be made of labels indicative of the presence/absence of a defect, or use may be made of labels indicative of the presence/absence of a defect and the kind of defect. The cluster data storage unit 10 may include an acquisition unit that acquires a plurality of pieces of existing training data; a computation unit that clusters the plurality of pieces of existing training data and computes cluster data representing clusters to which the respective existing training data belong; and a storage unit that stores the pieces of existing training data and the cluster data. Alternatively, the cluster data storage unit 10 may include only the storage unit among the acquisition unit, the computation unit and the storage unit, with the acquisition unit and the computation unit being configured as separate units. As the existing data, for example, use can be made of, as appropriate, management data collected in the manufacturing process of products, or data relating to quality management, such as inspection images acquired in inspections of products. The cluster data is information relating to clusters that are generated at a time of clustering the existing data. Specifically, for example, as the cluster data, use can be made of, as appropriate, information of clusters to which respective existing training data belong, center coordinates of each cluster within a feature space, and a distance from the center of the cluster to which each of the existing training data belongs. The cluster data, between the existing training data and the cluster data, may be stored in a cluster data computation apparatus (not illustrated), or in a server apparatus connected to a cloud.

The data extraction unit 20 extracts data used for additional training, from the pieces of existing training data in the cluster data storage unit 10. Specifically, for example, based on the cluster data, the data extraction unit 20 extracts a plurality of pieces of first existing training data (hereinafter referred to as "first data") from the pieces of existing training data in accordance with the size of each cluster. At this time, the data extraction unit 20 may randomly select and extract the pieces of first data. In addition, the data extraction unit 20 may select and extract the pieces of first data in accordance with a distance between the pieces of existing training data. Besides, the data extraction unit 20 may select and extract the pieces of first data in accordance with the distribution of each of the pieces of existing training data. Furthermore, the data extraction unit 20 may select and extract the pieces of first data in accordance with a label ratio of the pieces of existing training data in the clusters. In other words, within the range corresponding to the size of each cluster, the first existing training data can be acquired by random extraction, extraction according to the distance between data, extraction according to the distribution of data, or the label ratio of data in the clusters. In addition, the data extraction unit 20 may execute a plurality of kinds of algorisms in order to extract the first data.

The new training data acquisition unit 30 acquires a plurality of pieces of new training data in which new data is input data and a classification of defects according to the new data is output data. Here, the new training data is training data that has occurred with a distribution not existing in the existing training data, with the passing of time from the time of acquisition of the existing training data. Similarly as described above, as the new data, use can be made of, as appropriate, management data collected in the manufacturing process of products, or data relating to quality management, such as inspection images acquired in inspections of products.

The additional training data storage unit 40 stores a plurality of pieces of additional training data that are based on the pieces of first data and the pieces of new training data. Here, the pieces of additional training data may include all first data extracted by the data extraction unit 20 and all new training data acquired by the new training data acquisition unit 30. In addition, the pieces of first existing training data included in the pieces of additional training data may be some pieces of first data among the pieces of extracted first data. Besides, the pieces of new training data included in the pieces of additional training data may be some pieces of new training data among the pieces of acquired new training data. If a supplementary description is given, the meaning of "based on" is not limited to a case of storing all pieces of data, but includes a case of storing some pieces of data.

The advance training data storage unit 50 stores, as a plurality of pieces of advance training data, a plurality of pieces of second existing training data (hereinafter referred to as "second data") that are different from the pieces of first data, from among the pieces of existing training data.

The advance training unit 60 generates an advance training model by applying training to a training model, based on the pieces of advance training data. In the advance training, there is no need to use only a single training method for the training of a training model, and a plurality of kinds of algorithms may be executed. Besides, the training model may be called "classification model".

The advance training model storage unit 70 stores the advance training model generated by the advance training unit 60.

The additional training unit 80 applies additional training to the advance training model, based on the pieces of additional training data. In the additional training, there is no need to use only a single training method for the training of the advance training model, and a plurality of kinds of algorithms may be executed.

Figure 2:
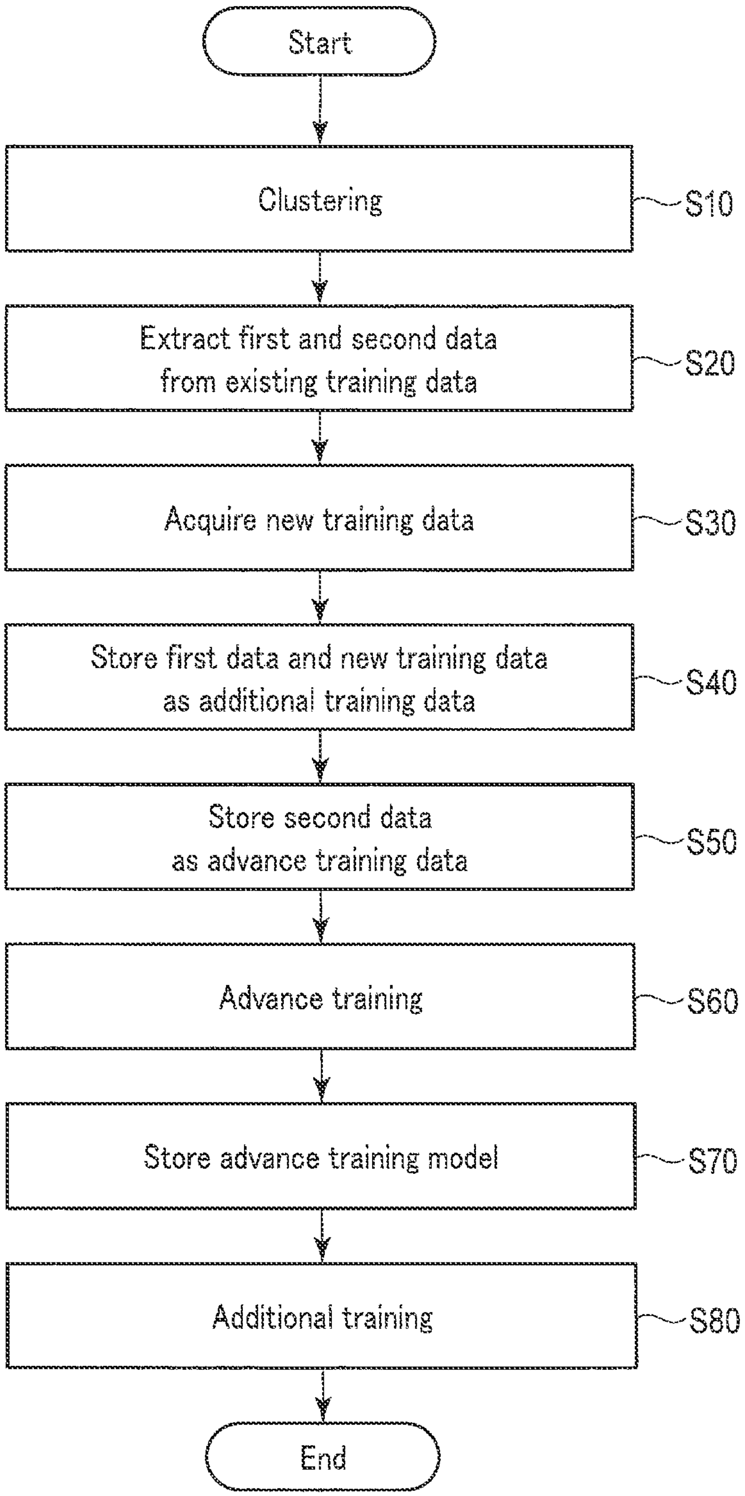
FIG. 2 is a flowchart illustrating an example of an operation in the first embodiment.
Figure 3:
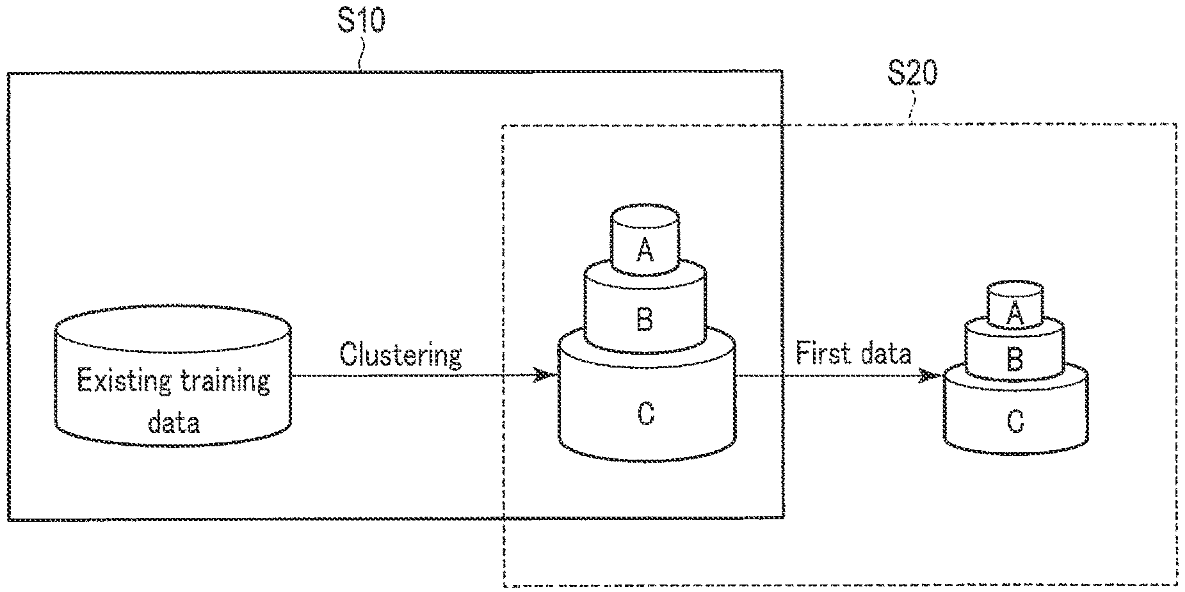
FIG. 3 is a schematic view for describing the operation in the first embodiment.

Next, an example of an operation of the additional training apparatus with the above configuration is described with reference to a flowchart of FIG. 2, a schematic view of FIG. 3, and graphs of FIG. 4 and FIG. 5.

In step S10, the acquisition unit in the cluster data storage unit 10 acquires a plurality of pieces of existing training data in which existing data is input data and a classification of defects according to the existing data is output data. In addition, as illustrated in FIG. 3, the computation unit in the cluster data storage unit 10 clusters the pieces of existing training data and computes cluster data representing clusters A, B and C to which the respective existing training data belong. Then, the storage unit in the cluster data storage unit 10 stores the pieces of existing training data and the cluster data.

In step S20, based on the cluster data, the data extraction unit 20 extracts a plurality of pieces of first data from the pieces of existing training data in accordance with the size of each of the clusters A, B and C. The pieces of first data are extracted from the pieces of existing training data in a state in which the size ratio between the clusters A, B and C after the clustering is maintained. Since the extracted first data retain the distribution of the original data, even if the data set becomes smaller, robust training for the existing training data can be performed. In addition, the data extraction unit 20 extracts, as a plurality of pieces of second data, a plurality of pieces of existing training data that are different from the pieces of first data, from among the pieces of existing training data. Note that the extraction of the second data may be executed in step S50 to be described later.

In step S30, the new training data acquisition unit 30 acquires a plurality of pieces of new training data in which new data is input data and a classification of defects according to the new data is output data.

In step S40, a plurality of pieces of additional training data, which are based on the pieces of first data and the pieces of new training data, are stored.

In step S50, the advance training data storage unit 50 stores, as a plurality of pieces of advance training data, a plurality of pieces of second data that are different from the pieces of first data, from among the pieces of existing training data. Note that, aside from a case of storing all pieces of second data, the advance training data storage unit 50 may store some pieces of second data among the pieces of second data. Specifically, the advance training data storage unit 50 stores the advance training data that are based on the second data other than the extracted first data.

In step S60, the advance training unit 60 generates an advance training model by applying training to a training model, based on the pieces of advance training data.

In step S70, the advance training model storage unit 70 stores the generated advance training model.

In step S80, the additional training unit 80 applies additional training to the advance training model, based on the pieces of additional training data.

Figure 4:
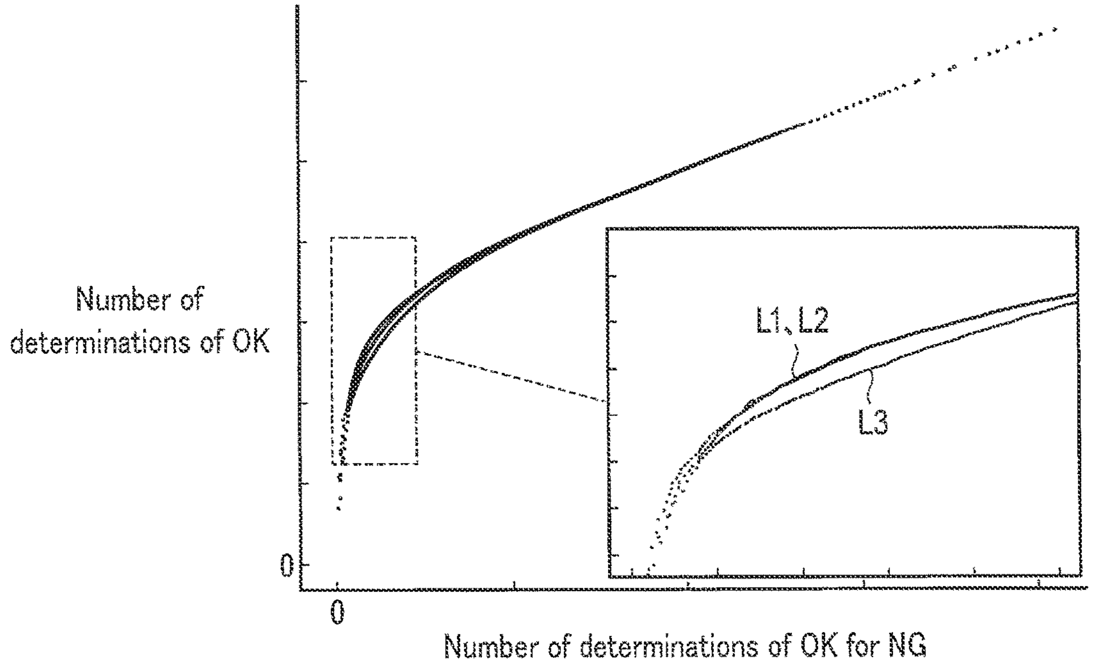
FIG. 4 is a graph for describing one example of an advantageous effect in the first embodiment.
Figure 5:
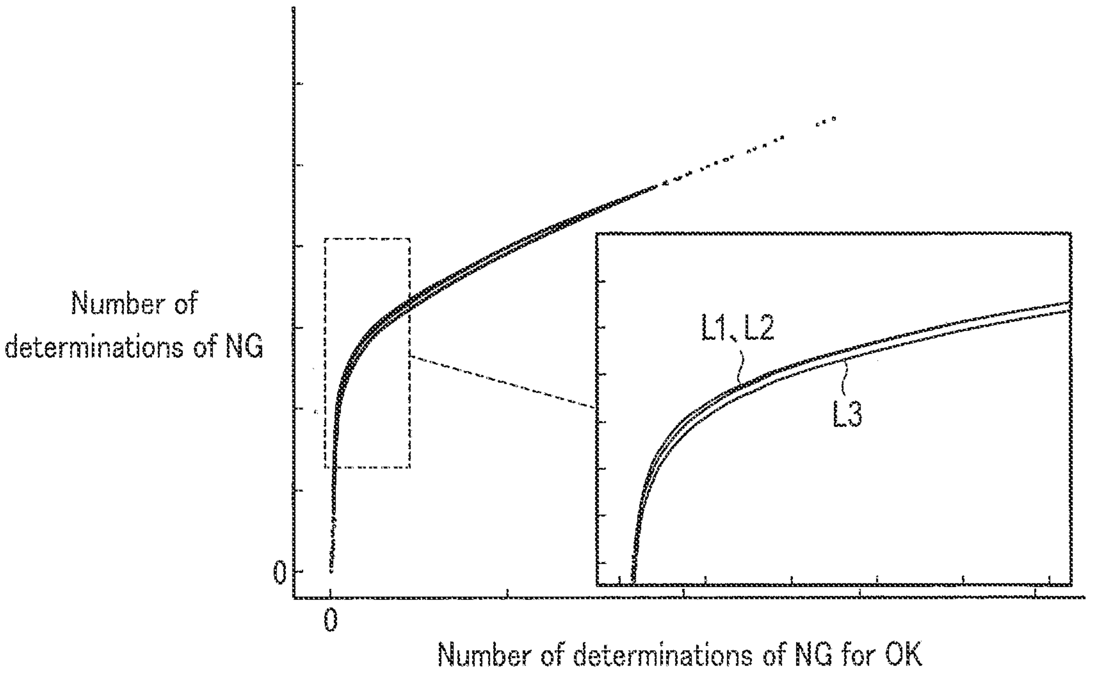
FIG. 5 is a graph for describing another example of the advantageous effect in the first embodiment.

FIG. 4 and FIG. 5 are graphs for describing examples of advantageous effects of the additional training. In FIG. 4, the ordinate axis indicates the number of determinations of OK by the advance training model in regard to the existing data. The abscissa axis indicates the number (incorrect answer number) of determinations of OK by the advance training model in regard to existing data (NG) corresponding to NG labels indicative of the presence of defects. In addition, in FIG. 5, the ordinate axis indicates the number of determinations of NG by the advance training model in regard to the existing data. The abscissa axis indicates the number (incorrect answer number) of determinations of NG by the advance training model in regard to existing data (OK). Each data in the graphs of FIG. 4 and FIG. 5 is plotted based on a confusion matrix relating to the number of data (data number) of determination values at a time of changing the threshold for determining the presence/absence of a defect in units of 0.001. The confusion matrix represents, in a table format, a data number of a class (TP: true positive) with correct determination values OK in regard to training data with OK labels; a data number of a class (TN: true negative) with correct determination values NG in regard to training data with NG labels; a data number of a class (FN: false negative) with incorrect determination values NG in regard to training data with OK labels; and a data number of a class (FP: false positive) with incorrect determination values OK in regard to training data with NG labels. FIG. 4 is based on the data number of the class (TP+FP) and the data number of the class (FP). FIG. 5 is based on the data number of the class (TN+FN) and the data number of the class (FN). In addition, in FIG. 4 and FIG. 5, a part of the classification result by the advance training model generated in step S60 is indicated by L1 in enlarged scale; and a part of the classification result by the advance training model that is additionally trained in step S80 is indicated by L2 in enlarged scale. Besides, a part of the classification result by a training model of a comparative example is indicated by L3 in enlarged scale. In the comparative example, existing training data are clustered, sub-data is extracted by extracting at least one data from each of the clusters, the sub-data are successively trained, sub-data with high accuracy is selected from the sub-data, and finally a training model trained by the selected sub-data is used. Note that although the sub-data of the comparative example are extracted from the respective clusters, the sub-data, unlike the present embodiment, are not extracted in accordance with the size of each cluster.

In addition, in FIG. 4 and FIG. 5, in the case of the data number of a class with all correct determination values, a straight line vertically extending from the origin 0 is drawn. In fact, however, since the data number of a class with incorrect determination values is included, a straight line drawn from the origin 0 curves at a midway point to the upper right. It can be said that a training model has a higher accuracy as the curve is located at a position closer to the upper left of the graph.

In FIG. 4 and FIG. 5, the classification result L1 of the advance training model generated in the present embodiment and the classification result L2 of the advance training model additionally trained in the present embodiment exhibit substantially equal curves. By contrast, the classification result L3 of the comparative example exhibits a curve with a smaller correct answer number, below the classification results L1 and L2 of the present embodiment. Specifically, in the result of the evaluation of existing data, the classification accuracies before and after the additional training in the present embodiment are substantially equal, and the classification accuracy in the comparative example is slightly lower.

Figure 6:
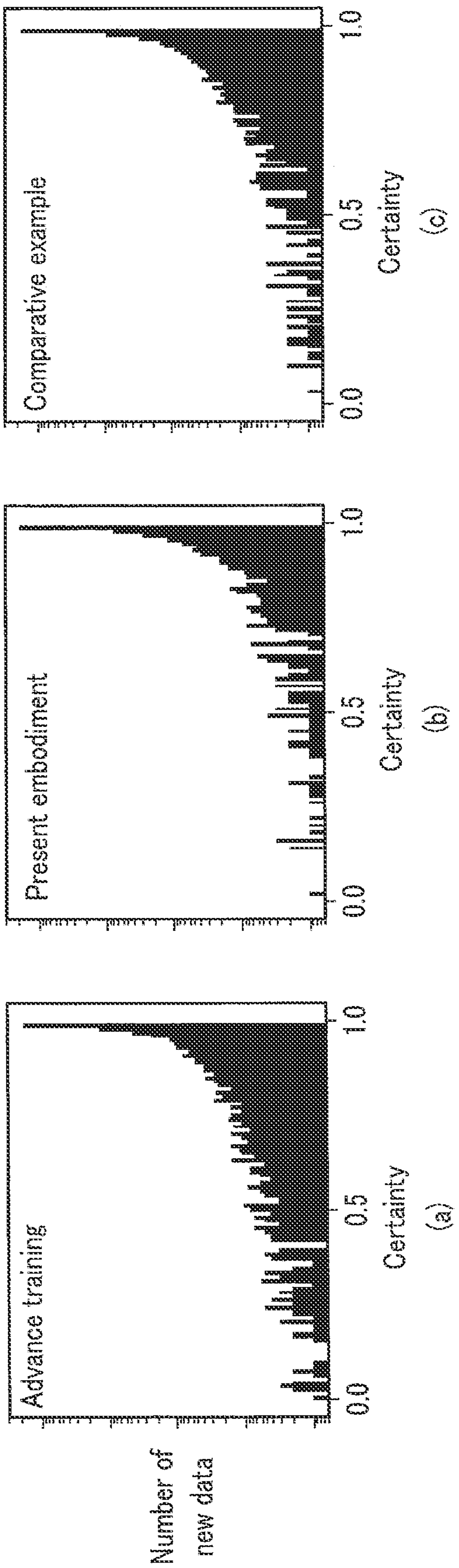
FIG. 6 is a graph for describing another example of the advantageous effect in the first embodiment.

FIG. 6 is a graph for describing another example of the advantageous effect of the additional training. In FIG. 6, the ordinate axis indicates the number of new data (all OK) by logarithmic scale. The abscissa axis indicates the certainty (certainty of correct answers) of determination (classification) of OK. A graph of part (a) of FIG. 6 indicates the certainty by the advance training model generated in the above-described step S60. A graph of part (b) of FIG. 6 indicates the certainty by the advance training model additionally trained in the above-described step S80. A graph of part (c) of FIG. 6 indicates the certainty by the training model of the above-described comparative example. In FIG. 6, in the case of the certainty of all correct answers, a straight line vertically extending from the certainty "1" is drawn. In fact, however, since certainties of less than 1 are included, a distribution with a base spreading from the peak of the certainty "1" toward the certainty "0" is obtained. In FIG. 6, it can be said that if a training model has a distribution of certainty deviating more to the right side, the training model has a higher accuracy.

The distributions of certainty illustrated in part (a) of FIG. 6 and part (c) of FIG. 6 are substantially equal. By contrast, the distribution of certainty illustrated in part (b) of FIG. 6 deviates more to the right side than the other distributions. Specifically, in the result of the evaluation of new data, the classification accuracy after the additional training in the present embodiment is high, and the classification accuracy before the additional training in the present embodiment and the classification accuracy in the comparative example are slightly lower.

As described above, according to the first embodiment, the cluster data storage unit 10 stores a plurality of pieces of existing training data in which existing data is input data and a classification of defects according to the existing data is output data, and cluster data representing clusters to which the respective pieces of existing training data belong. Based on the cluster data, the data extraction unit 20 extracts a plurality of pieces of first data (first existing training data) from the pieces of existing training data in accordance with the size of each cluster. The new training data acquisition unit 30 acquires a plurality of pieces of new training data in which new data is input data and a classification of defects according to the new data is output data. The additional training data storage unit 40 stores a plurality of pieces of additional training data that are based on the pieces of first data and the pieces of new training data.

In this manner, by the configuration that creates the additional training data including the pieces of existing training data according to the size of each cluster and the pieces of new training data, the classification accuracy of the new data can be enhanced while maintaining the classification accuracy of the existing data. If a supplementary description is given, while the classification accuracy of the training model is maintained for the existing data, the training is performed by adding new defects at the time of additional training, and thereby the classification accuracy of the training model can be enhanced for the new data that newly occurs.

In addition, according to the first embodiment, the advance training data storage unit 50 stores, as a plurality of pieces of advance training data, a plurality of pieces of second data (second existing training data) that are different from the pieces of first data, from among the pieces of existing training data. The advance training unit 60 generates an advance training model by applying training to a training model, based on the pieces of advance training data. The additional training unit 80 applies additional training to the advance training model, based on the pieces of additional training data. Accordingly, the advance training model, which is trained by the second data that are left after the extraction of the first data, is additionally trained by the first data and the new training data, and thereby the classification accuracy of the new data can be enhanced without deteriorating the classification accuracy of the existing data.

Furthermore, for example, compared to the above-described comparison example, the training cost can be reduced. If a supplementary description is given, in the above-described comparative example, a plurality of pieces of sub-training data are created by sampling from training data, and a model meeting a condition is selected from models additionally trained by the respective sub-training data and evaluation results thereof. In the method of the comparative example, although the size of sub-training data for additional training becomes smaller, the number of times of training using the sub-data becomes larger, and multiple times of additional training are necessary, leading to an increase in cost of additional training.

By contrast, according to the first embodiment, after the clustering, the first data are extracted by maintaining the size ratio between the clusters, and a high classification accuracy can be obtained by one-time additional training.

As another comparative example, a case is discussed in which training data are clustered in order to extract data while retaining a data tendency before extraction, and additional training data are extracted at a ratio equal to the sizes of the clusters after the clustering. In this another comparative example, since the clustering is performed after adding new data to existing data, there is a possibility that features of new data included in the additional training data after the extraction are not retained. Thus, in this another comparative example, it is estimated that an improvement of the classification accuracy for the new data is not expected in the training model after additional training.

By contrast, according to the first embodiment, at a time of combining new training data into additional training data, the new training data are added in such a form that the new training data are added to the existing training data according to the size of each cluster, and therefore the features of the new data can be retained while the classification accuracy of the existing data is maintained. In other words, according to the first embodiment, at a time of the occurrence of new data, existing training data are clustered, and additional training data are created based on the first data in which the distribution information of the existing training data is maintained, and the new training data that is newly acquired, and therefore the features of the new data can be maintained.

Modifications of the First Embodiment

Next, a modification of the first embodiment is described. The modification is similarly applicable to each of embodiments to be described below.

In the first embodiment, in step S20, the details of the operation in which the data extraction unit 20 extracts a plurality of pieces of first data are not specified, but the details of the operation may be specified as follows. For example, the data extraction unit 20 may randomly select and extract a plurality of first existing training data. In addition, the data extraction unit 20 may select and extract a plurality of pieces of first existing training data in accordance with the distance between the pieces of first existing training data. Further, the data extraction unit 20 may select and extract a plurality of pieces of first existing training data in accordance with the distribution of the respective pieces of first existing training data. Besides, the data extraction unit 20 may select and extract a plurality of pieces of first existing training data in accordance with the label ratio of the respective pieces of first existing training data in the clusters. Such modifications can also obtain the same advantageous effects as the first embodiment.

Second Embodiment

Next, an additional training apparatus according to a second embodiment is described.

The second embodiment is a modification of the first embodiment, and is configured to make higher the accuracy of labels of the first data.

Figure 7:
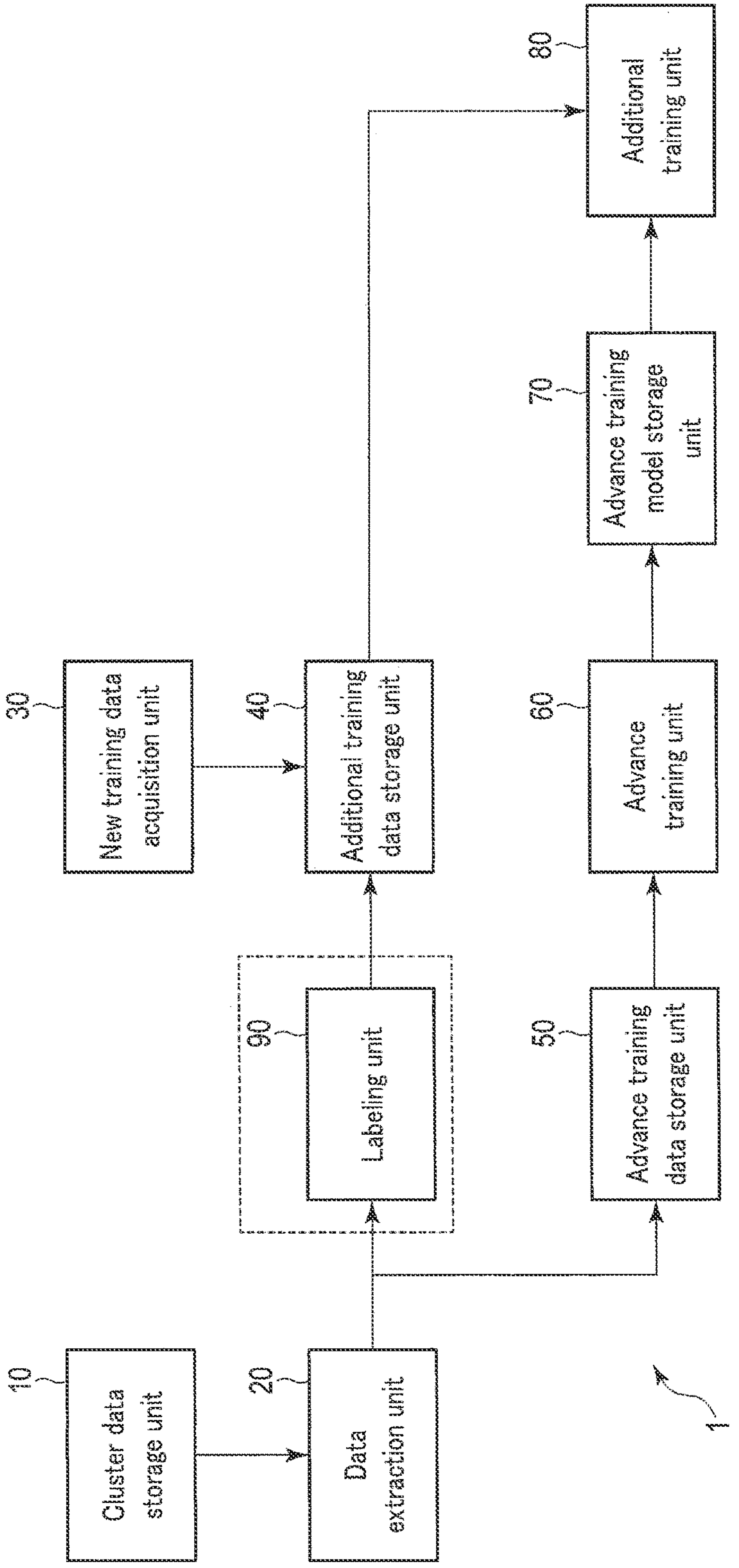
FIG. 7 is a block diagram illustrating an example of an additional training apparatus according to a second embodiment.

FIG. 7 is a block diagram illustrating an example of the additional training apparatus according to the second embodiment. Structural elements similar to the above-described structural elements are denoted by identical reference signs, and a detailed description thereof is omitted, and different parts are mainly described. In the embodiments to be described below, overlapping descriptions are similarly omitted.

In FIG. 7, compared to the configuration illustrated in FIG. 1, the additional training apparatus 1 further includes a labeling unit 90 between the data extraction unit 20 and the additional training data storage unit 40.

The labeling unit 90 labels the pieces of first data extracted by the data extraction unit 20 by labels with higher accuracy.

Accordingly, the additional training data storage unit 40 stores a plurality of pieces of additional training data that are based on the pieces of labeled first data, and pieces of new training data.

The other configuration is the same as in the first embodiment.

Figure 8:
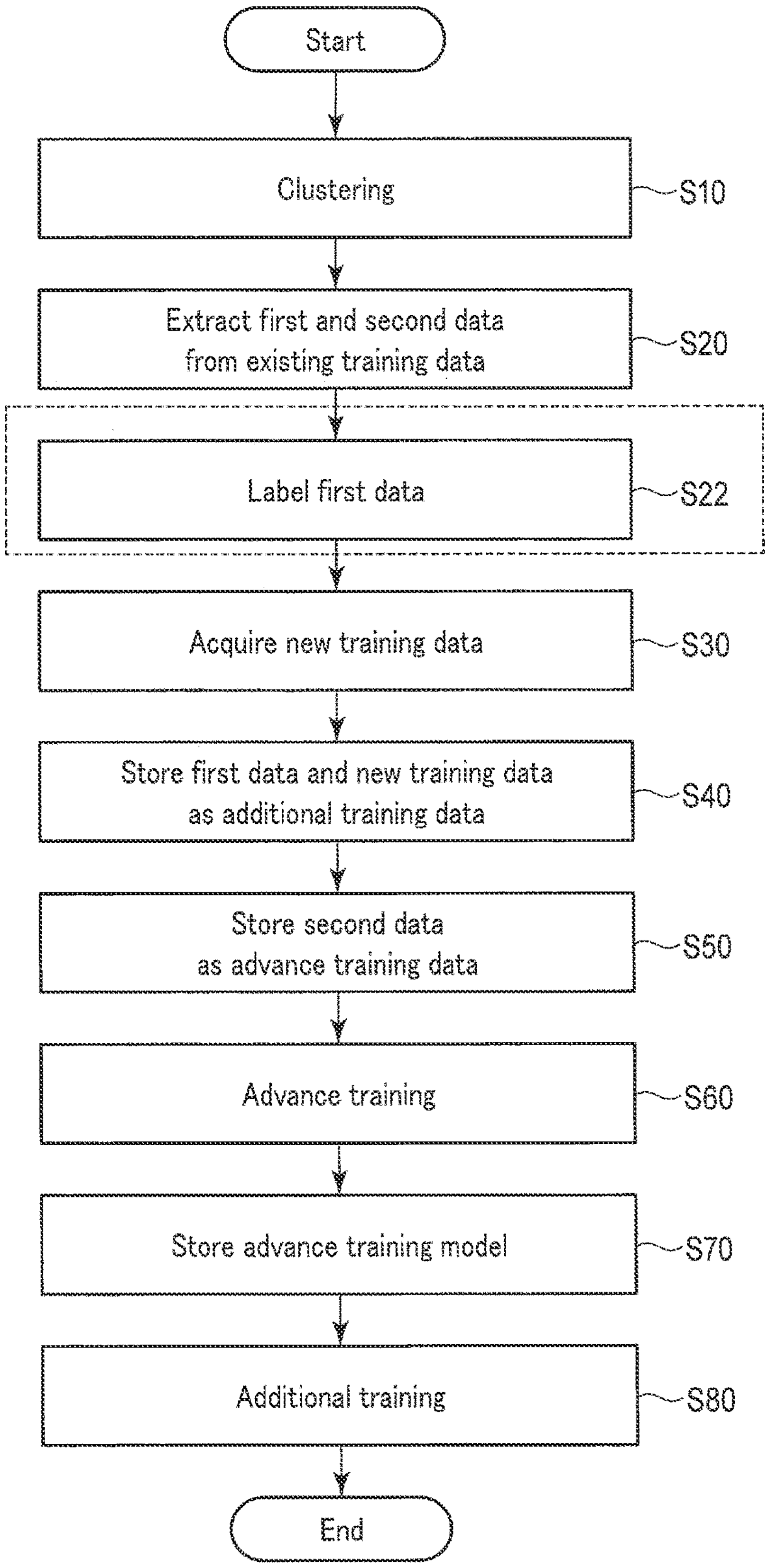
FIG. 8 is a flowchart illustrating an example of an operation in the second embodiment.

Next, an operation of the additional training apparatus with the above configuration is described with reference to a flowchart of FIG. 8.

In the same manner as described above, steps S10 and S20 are executed, and a plurality of pieces of first data and a plurality of pieces of second data are extracted from a plurality of pieces of existing training data.

After step S20, in step S22, the labeling unit 90 labels the extracted pieces of first data by labels with higher accuracy.

After step S22, step S30 is executed similarly as described above, and a plurality of pieces of new training data are acquired.

After step S30, in step S40, the additional training data storage unit 40 stores a plurality of pieces of additional training data that are based on the pieces of labeled first data and the pieces of new training data.

Subsequently, steps S50 to S80 are executed similarly as described above.

As described above, according to the second embodiment, the labeling unit 90 labels the extracted pieces of first data by labels with higher accuracy. The additional training data storage unit 40 stores the pieces of additional training data that are based on the pieces of labeled first data and the pieces of new training data. Accordingly, in addition to the advantageous effects of the first embodiment, by the configuration of applying labeling with higher accuracy to the first data that are before being added to the additional training data, it can be expected that a training model with higher robustness to the existing data is created.

Modification of the Second Embodiment

Next, a modification of the second embodiment is described. The modification is similarly applicable to each of embodiments to be described below.

In the second embodiment, the labeling unit 90 labels the pieces of first data by labels with higher accuracy, but the second embodiment is not limited to this. For example, a further labeling unit may label the pieces of new training data by labels with higher accuracy. In this case, by the configuration of applying labeling with accuracy to the new training data that are before being added to the additional training data, it can be expected that a training model with higher robustness to the new data is created.

Third Embodiment

Next, an additional training apparatus according to a third embodiment is described.

The third embodiment is a modification of the first embodiment, and is configured to hold down the size of new training data.

Figure 9:
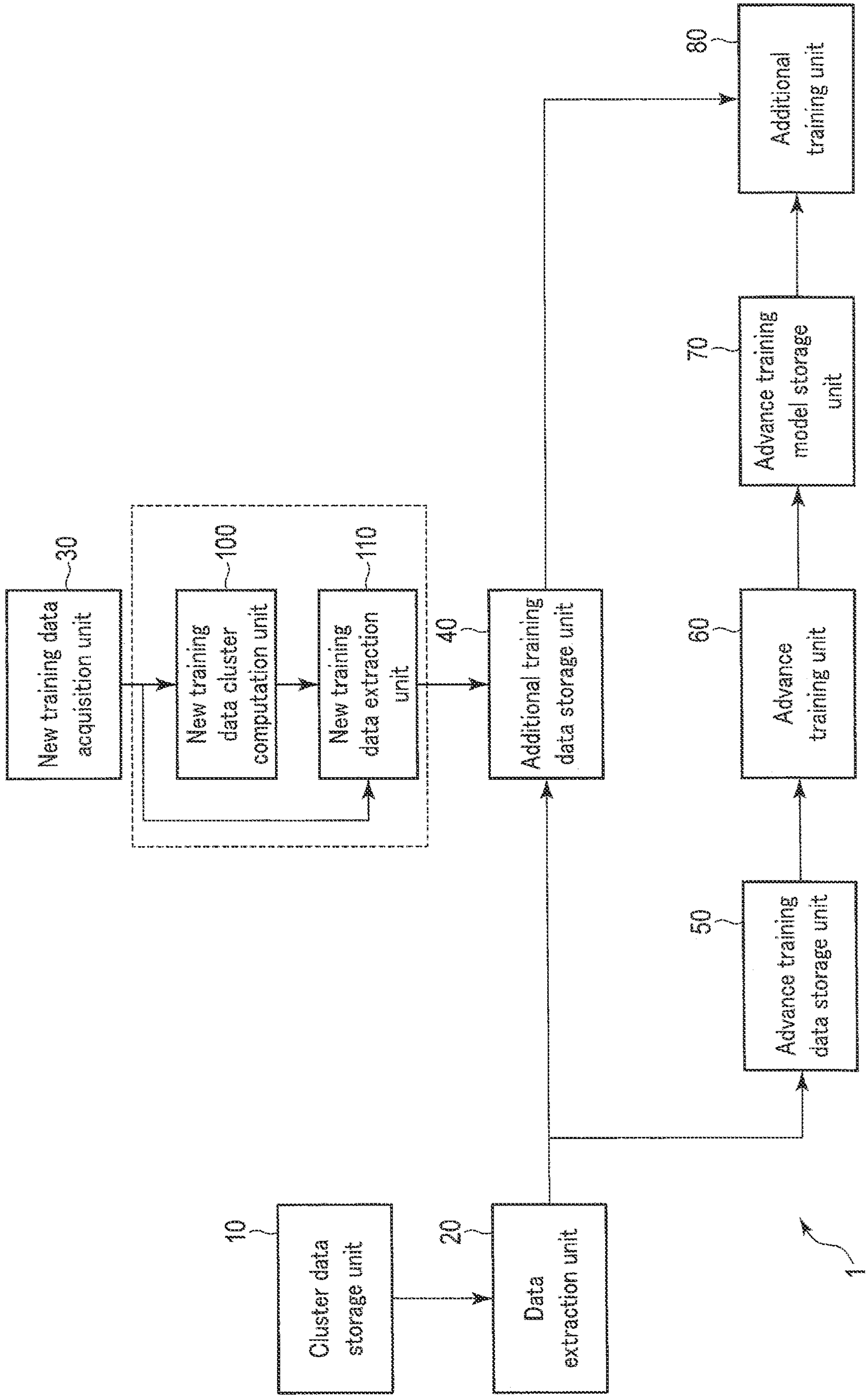
FIG. 9 is a block diagram illustrating an example of an additional training apparatus according to a third embodiment.

FIG. 9 is a block diagram illustrating an example of the additional training apparatus according to the third embodiment. Compared to the configuration illustrated in FIG. 1, this additional training apparatus 1 further includes a new training data cluster computation unit 100 and a new training data extraction unit 110 between the new training data acquisition unit 30 and the additional training data storage unit 40.

Here, the new training data cluster computation unit 100 clusters a plurality of pieces of new training data acquired by the new training data acquisition unit 30, and computes cluster data representing clusters to which the respective pieces of new training data belong. Note that the new training data cluster computation unit 100 is an example of a cluster computation unit.

Based on the cluster data, the new training data extraction unit 110 extracts a plurality of pieces of new data for additional training from the pieces of new training data, while maintaining the features of the pieces of new training data.

Accordingly, the additional training data storage unit 40 stores a plurality of pieces of additional training data by using the extracted pieces of new data for additional training as a plurality of pieces of new training data.

The other configuration is the same as in the first embodiment.

Figure 10:
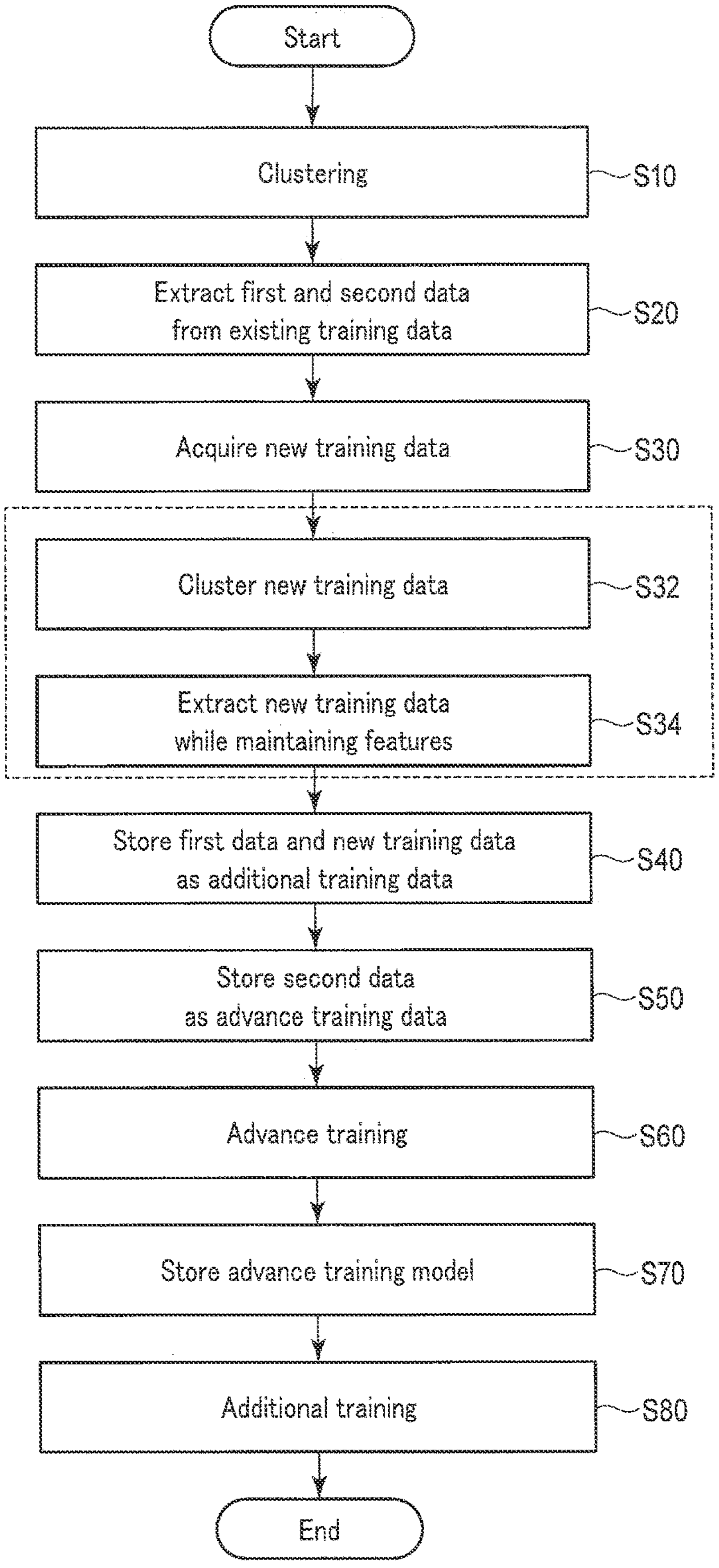
FIG. 10 is a flowchart illustrating an example of an operation in the third embodiment.

Next, an operation of the additional training apparatus with the above configuration is described with reference to a flowchart of FIG. 10.

In the same manner as described above, steps S10 to S30 are executed, and a plurality of pieces of new training data are acquired.

In step S32, the new training data cluster computation unit 100 clusters a plurality of pieces of new training data acquired in step S30, and computes cluster data representing clusters to which the respective pieces of new training data belong.

After step S32, in step S34, based on the cluster data, the new training data extraction unit 110 extracts a plurality of pieces of new data for additional training (new training data) from the pieces of new training data, while maintaining the features of the pieces of new training data.

After step S34, in step S40, the additional training data storage unit 40 stores a plurality of pieces of additional training data by using, as pieces of new training data, the pieces of new data for additional training, which are extracted in step S34. In other words, the additional training data storage unit 40 stores a plurality of pieces of additional training data that are based on the pieces of first data and the pieces of new training data (new data for additional training).

Subsequently, steps S50 to S80 are executed similarly as described above.

As described above, according to the third embodiment, the new training data cluster computation unit 100 clusters a plurality of pieces of new training data, and computes cluster data representing clusters to which the respective pieces of new training data belong. Based on the cluster data, the new training data extraction unit 110 extracts a plurality of pieces of new data for additional training from the pieces of new training data, while maintaining the features of the pieces of new training data. The additional training data storage unit 40 stores a plurality of pieces of additional training data by using, as pieces of new training data, the pieces of new data for additional training. Accordingly, in addition to the advantageous effects of the first embodiment, power saving in additional training can be expected by holding down the size of the data set by extracting the new training data before being added.

Modification of the Third Embodiment

Next, a modification of the third embodiment is described. In the third embodiment, compared to the configuration illustrated in FIG. 1, the new training data cluster computation unit 100 and the new training data extraction unit 110 are further included, but the third embodiment is not limited to this. Specifically, in the present modification, compared to the configuration illustrated in FIG. 7, the new training data cluster computation unit 100 and the new training data extraction unit 110 may further be included. In this case, in addition to the advantageous effects of the third embodiment, the advantageous effects of the second embodiment can be obtained. Similarly, the modification of the third embodiment may be applied to the modification of the second embodiment.

Fourth Embodiment

Figure 11:
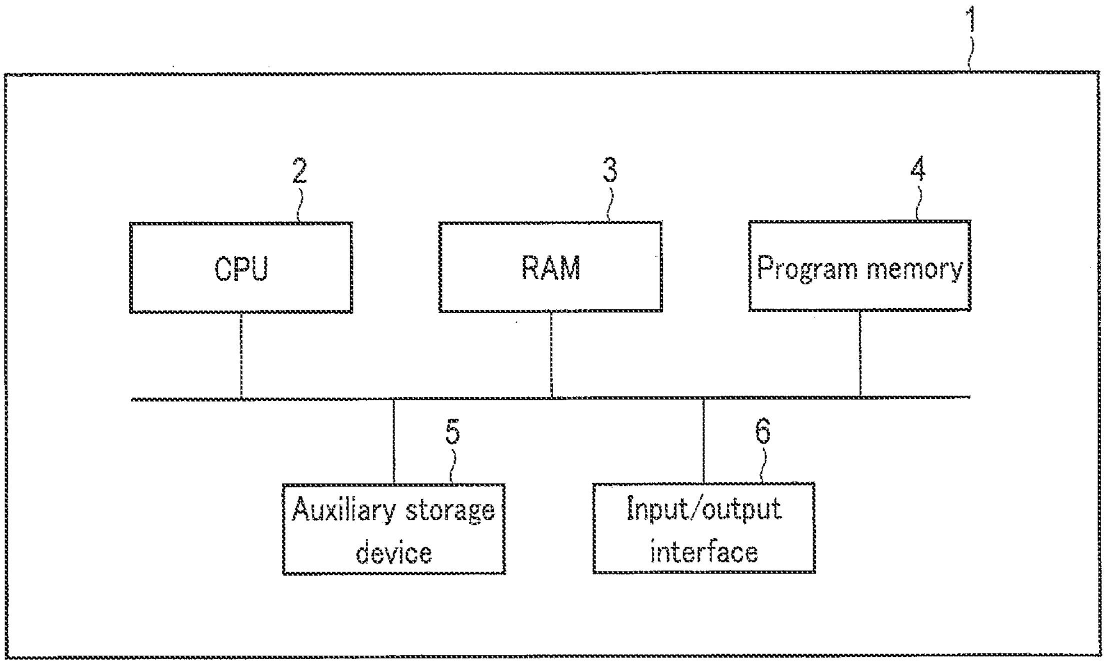
FIG. 11 is a block diagram illustrating an example of a hardware configuration of an additional training apparatus according to a fourth embodiment.

FIG. 11 is a block diagram illustrating an example of a hardware configuration of an additional training apparatus according to a fourth embodiment. The fourth embodiment is a concrete example of the first to third embodiments, in which the additional training apparatus 1 is implemented by a computer.

The additional training apparatus 1 includes, as hardware, a CPU (Central Processing Unit) 2, a RAM (Random Access Memory) 3, a program memory 4, an auxiliary storage device 5, and an input/output interface 6. The CPU 2 communicates with the RAM 3, program memory 4, auxiliary storage device 5 and input/output interface 6 via a bus.

Specifically, the additional training apparatus 1 of the present embodiment is implemented by a computer with this hardware configuration.

The CPU 2 is an example of a general-purpose processor. The RAM 3 is used by the CPU 2 as a working memory. The RAM 3 includes a volatile memory such as an SDRAM (Synchronous Dynamic Random Access Memory). The program memory 4 stores a program for implementing the respective components according to each embodiment. This program may be, for example, a program for enabling the computer to implement the functions of the respective components illustrated in the first to third embodiments. In addition, as the program memory 4, for example, a ROM (Read-Only Memory), a part of the auxiliary storage device or a combination thereof is used. The auxiliary storage device 5 non-transitorily stores data. The auxiliary storage device 5 includes a nonvolatile memory such as an HDD (hard disk drive) or an SSD (solid state drive). The auxiliary storage device 5 is an example of a memory.

The input/output interface 6 is an interface for connection to other devices. The input/output interface 6 is used, for example, for connection to a keyboard, a mouse and a display.

The program stored in the program memory 4 includes computer executable instructions. If the program (computer executable instructions) is executed by the CPU 2 that is processing circuitry, the program causes the CPU 2 to execute a predetermined process. For example, if the program is executed by the CPU 2, the program causes the CPU 2 to execute sequential processes described in connection with the respective components in FIG. 1, FIG. 7 or FIG. 9. For example, if the computer executable instructions included in the program are executed by the CPU 2, the computer executable instructions cause the CPU 2 to execute the additional training method. The additional training method may include the steps corresponding to the functions of the above-described components. Besides, the additional training method may include, as appropriate, the steps illustrated in FIG. 2, FIG. 8 or FIG. 10.

The program may be provided to the additional training apparatus 1 that is a computer, in a state in which the program is stored in a computer readable storage medium. In this case, for example, the additional training apparatus 1 further includes a drive (not illustrated) that reads data from the storage medium, and acquires the program from the storage medium. As the storage medium, for example, use can be made of, as appropriate, a magnetic disk, an optical disc (CD-ROM, CD-R, DVD-ROM, DVD-R, or the like), a magneto-optical disc (MO or the like), or a semiconductor memory. The storage medium may be called "non-transitory computer readable storage medium". In addition, the program may be stored in a server on a communication network, and the additional training apparatus 1 may download the program from the server by using the input/output interface 6.

The processing circuitry that executes the program is not limited to a general-purpose hardware processor such as the CPU 2, and a purpose-specific hardware processor such as an ASIC (Application Specific Integrated Circuit) may be used. The term "processing circuitry (processing unit)" includes at least one general-purpose hardware processor, at least one purpose-specific hardware processor, or a combination of at least one general-purpose hardware processor and at least one purpose-specific hardware processor. In the example illustrated in FIG. 11, the CPU 2, RAM 3 and program memory 4 correspond to the processing circuitry.

According to at least one of the above-described embodiments, the classification accuracy of new data can be enhanced while the classification accuracy of existing data is maintained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An additional training apparatus comprising processing circuitry configured to:

store, in a memory, (i) a plurality of pieces of existing training data in which existing data is input data and a classification of defects according to the existing data is output data, and (ii) cluster data representing clusters to each of which respective pieces of the existing training data belong;

extract, based on the cluster data, a plurality of pieces of first existing training data from each of the clusters as a subset of the pieces of the existing training data therein such that a size ratio between the clusters after extraction is maintained, whereby the extracted first existing training data retain a distribution of the existing training data such that robust training for the existing training data can be performed;

acquire a plurality of pieces of new training data in which new data is input data and a classification of defects according to the new data is output data; and store, in the memory, a plurality of pieces of additional training data that are based on the pieces of first existing training data and the pieces of new training data.

2. The additional training apparatus of claim 1, wherein the processing circuitry is further configured to:

store, in the memory, as a plurality of pieces of advance training data, a plurality of pieces of second existing training data that are different from the pieces of first existing training data, from among the pieces of the existing training data;

generate an advance training model by applying training to a training model, based on the pieces of advance training data; and apply additional training to the advance training model, based on the pieces of additional training data.

3. The additional training apparatus of claim 1, wherein the processing circuitry is further configured to:

cluster the pieces of new training data that are acquired, and compute cluster data representing clusters to each of which respective pieces of the new training data belong;

extract, based on the cluster data, a plurality of pieces of new data for additional training from the pieces of new training data, while maintaining features of the pieces of new training data; and store, in the memory, the pieces of additional training data by using the extracted pieces of new data for additional training as the pieces of new training data.

4. The additional training apparatus of claim 1, wherein the processing circuitry is further configured to randomly select and extract the pieces of first existing training data.

5. The additional training apparatus of claim 1, wherein the processing circuitry is further configured to select and extract the pieces of first existing training data in accordance with a distance between the pieces of existing training data.

6. The additional training apparatus of claim 1, wherein the processing circuitry is further configured to select and extract the pieces of first existing training data in accordance with a distribution of each of the pieces of existing training data.

7. The additional training apparatus of claim 1, wherein the processing circuitry is further configured to select and extract the pieces of first existing training data in accordance with a label ratio of the pieces of existing training data in the clusters.

8. The additional training apparatus according to claim 1, wherein the cluster data representing the clusters comprises data on center coordinates of each of the clusters within a feature space.

9. The additional training apparatus according to claim 1, wherein the existing training data comprises data relating to at least one of manufacturing or inspection of the products.

10. An additional training method comprising:

storing, in a memory, (i) a plurality of pieces of existing training data in which existing data is input data and a classification of defects according to the existing data is output data, and (ii) cluster data representing clusters to each of which respective pieces of the existing training data belong;

extracting, based on the cluster data, a plurality of pieces of first existing training data from each of the clusters as a subset of the pieces of the existing training data therein such that a size ratio between the clusters after extraction is maintained, whereby the extracted first existing training data retain a distribution of the existing training data such that robust training for the existing training data can be performed;

acquiring a plurality of pieces of new training data in which new data is input data and a classification of defects according to the new data is output data; and storing, in the memory, a plurality of pieces of additional training data that are based on the pieces of first existing training data and the pieces of new training data.

11. A non-transitory computer readable storage medium including computer executable instructions, wherein the instructions, when executed by a processor, cause the processor to perform a method comprising:

storing, in a memory, (i) a plurality of pieces of existing training data in which existing data is input data and a classification of defects according to the existing data is output data, and (ii) cluster data representing clusters to each of which respective pieces of the existing training data belong;

extracting, based on the cluster data, a plurality of pieces of first existing training data from each of the clusters as a subset of the pieces of the existing training data therein such that a size ratio between the clusters after extraction is maintained, whereby the extracted first existing training data retain a distribution of the existing training data such that robust training for the existing training data can be performed;

acquiring a plurality of pieces of new training data in which new data is input data and a classification of defects according to the new data is output data; and storing, in the memory, a plurality of pieces of additional training data that are based on the pieces of first existing training data and the pieces of new training data.

* * * * *